United States Patent [19]
Norton

[11] Patent Number: 5,228,289
[45] Date of Patent: Jul. 20, 1993

[54] PLURAL HYDRAULIC PUMP SYSTEM WITH UNLOADING VALVE

[76] Inventor: Peter Norton, 15612 Hilton, Southfield, Mich. 48075

[21] Appl. No.: 811,875

[22] Filed: Dec. 19, 1991

Related U.S. Application Data

[63] Continuation of Ser. No. 542,631, Jun. 22, 1990, abandoned, which is a continuation of Ser. No. 239,055, Sep. 1, 1988, abandoned, which is a continuation of Ser. No. 92,330, Sep. 2, 1987, abandoned, which is a continuation of Ser. No. 735,898, May 20, 1985, abandoned, which is a continuation of Ser. No. 508,845, Jun. 29, 1983, abandoned.

[51] Int. Cl.$^5$ .................. F16D 31/02; F04B 41/06
[52] U.S. Cl. ........................... 60/486; 303/10; 417/5; 417/287; 417/288
[58] Field of Search ............... 417/3, 4, 5, 286, 287, 417/288, 428; 60/486; 303/10

[56] References Cited

U.S. PATENT DOCUMENTS

| | | | |
|---|---|---|---|
| 2,276,895 | 3/1942 | Vosseler et al. | 417/428 |
| 2,349,310 | 5/1944 | Schnell | 417/4 |
| 2,366,388 | 1/1945 | Crosby | 60/486 X |
| 2,407,097 | 9/1946 | Porter | 60/545 X |
| 2,475,413 | 7/1949 | Towler et al. | 417/287 |
| 2,665,637 | 1/1954 | Lauck | 417/286 |
| 2,700,397 | 1/1955 | Compton | 137/569 |
| 2,700,397 | 1/1955 | Compton | 137/569 |
| 2,761,388 | 9/1956 | Peterson | 417/286 |
| 2,898,737 | 8/1959 | Rockwell | 417/287 |
| 2,924,940 | 2/1960 | Covert et al. | 60/430 |
| 3,053,044 | 9/1962 | Gresty | 60/486 |
| 3,198,121 | 8/1965 | Schaub | 417/4 |
| 3,385,312 | 5/1968 | Kinnamon et al. | 417/287 X |
| 3,446,238 | 5/1969 | Norstrud et al. | 417/28 X |
| 3,601,506 | 8/1971 | Griswold | 417/286 |
| 3,619,093 | 11/1971 | Harle et al. | 417/310 X |
| 3,635,604 | 1/1972 | Petersen et al. | 417/310 X |
| 3,695,783 | 10/1972 | Soyland et al. | 417/286 X |
| 3,836,206 | 9/1974 | Leiber | 303/10 |
| 3,924,971 | 12/1975 | Jacquot | 60/468 X |
| 3,968,811 | 7/1976 | Fillion | 60/430 X |
| 3,975,909 | 8/1976 | McBurnett | 60/486 X |
| 4,002,027 | 1/1977 | Eley et al. | 60/468 X |
| 4,073,140 | 2/1978 | Lang et al. | 60/405 |
| 4,116,577 | 9/1978 | Lauck | 417/286 |
| 4,171,712 | 10/1979 | DeForrest | 137/529 X |
| 4,199,943 | 4/1980 | Hunt | 60/430 |
| 4,225,288 | 9/1980 | Mugele et al. | 417/28 X |
| 4,245,964 | 1/1981 | Rannenberg | 417/287 |
| 4,609,330 | 9/1986 | Fahey et al. | 417/288 |
| 4,850,813 | 7/1989 | Fisher | 417/288 |
| 5,040,951 | 8/1991 | Nikaido | 417/287 X |
| 5,087,177 | 2/1992 | Haley et al. | 417/288 X |
| 5,163,542 | 11/1992 | Saiga | 417/288 X |
| 5,165,862 | 11/1992 | Lindblom | 417/287 X |

FOREIGN PATENT DOCUMENTS

| | | | |
|---|---|---|---|
| 1431991 | 7/1969 | Fed. Rep. of Germany | 303/10 |
| 1800633 | 5/1970 | Fed. Rep. of Germany | 303/10 |
| 3523373 | 1/1987 | Fed. Rep. of Germany | 303/10 |
| 2090915 | 7/1982 | United Kingdom | 417/286 |

Primary Examiner—Edward K. Look
Assistant Examiner—John Ryznic

[57] ABSTRACT

A pump system is disclosed which operates at high efficiency in either a high volume, low pressure mode or a low volume, high pressure mode. First and second internal gear pumps are driven by a common drive shaft. The first pump has a smaller displacment than the second pump and both pumps deliver pressurized fluid to a common discharge passage. An unloading valve is operative to dump the output of the second pump in response to fluid pressure in the discharge passage so that it delivers fluid to the load device only when the pressure is below a predetermined value. The unloading valve also performs the function of a low capacity accumulator. A check valve is provided to prevent back flow in the outlet of the second pump.

13 Claims, 4 Drawing Sheets

Fig-1

Fig-4

PLURAL HYDRAULIC PUMP SYSTEM WITH UNLOADING VALVE

This application is a continuation of Ser. No. 07/542,631 filed Jun. 22, 1990 now abandoned; which is a continuation of Ser. No. 07/239,055 filed Sep. 1, 1988 now abandoned; which is a continuation of Ser. No. 07/092,330 filed Sep. 2, 1987 now abandoned; which is a continuation of Ser. No. 06/735,898 filed May 20, 1985 now abandoned; which is a continuation of Ser. No. 06/508,845 filed Jun. 29, 1983 now abandoned.

FIELD OF THE INVENTION

This invention relates to hydraulic pumps and more particularly it relates to pump systems capable of both high volume, low pressure operation and low volume, high pressure operation. It is especially useful to provide pressurized fluid to power an hydraulically energized booster for the hydraulic braking system of a vehicle.

BACKGROUND OF THE INVENTION

There are certain hydraulic systems which require high volume flow at low pressure as well as low volume flow at high pressure. Such a requirement occurs, for example, in a system in which a piston moves freely until it encounters a load reaction member which imposes a relatively high resistance to further motion of the piston. In such an arrangement, it is desired to have a pump system which delivers high volume flow at low pressure to provide for free travel of the piston over a relatively large range and then delivers low volume flow at high pressure for piston displacement over a small range of travel. This would allow high speed motion during the free travel and the exertion of a relatively large force over a small range of travel and at a standstill.

Hydraulic brakes on automotive vehicles are commonly provided with means to assist the driver in the application of the brakes. Such brake systems, known as "power brakes", conventionally include a servo motor called a "booster" for augmenting the force applied by the driver to the piston of the master cylinder. It has been a common practice to utilize a vacuum powered booster on vehicles having spark ignited engines because of the availability of intake manifold vacuum for energizing the booster. However, on many present day vehicles it is desired to use an hydraulic booster with an electrically energized hydraulic pump. Such is the case with diesel engine vehicles which have no convenient vacuum source. It is also desired to have an electrically powered booster for other reasons such as having booster operation with the engine off.

In an hydraulic brake system, the flow requirement during the initial brake pedal travel is different from that during the final pedal travel. The system requires a high volume, low pressure flow during the free travel of the movable brake members and then when the brake members, e.g. brake pad and disc are engaged, the system requires high pressure, low volume flow to exert the braking effort.

In the prior art, it is known to use a motor driven hydraulic booster pump with the motor being energized from the vehicle battery. In one such arrangement, hydraulic fluid under pressure from the pump is stored in an accumulator. The pump is turned on and off in response to accumulator pressure in order to meet the flow requirements of the brake system. This is disadvantageous in that it requires both the accumulator and switch which are expensive components. Also, a high power motor is required to provide sufficient fluid for the situation when the driver pumps the brake pedal. Also, accumulators are not always reliable and they gradually lose pressurization gas thus requiring replacement after a number of years. Also, the accumulator must be charged at all times when the vehicle is in operation with the consequence that the motor is turned on at times not necessarily coincident with the application of the brakes resulting in an on/off cycle which is distracting to the driver. It is also known in the prior art to maintain a continuous flow of fluid from the pump, which is energized from the vehicle engine or an electric motor, and to impose restriction on the flow to obtain the pressure required to actuate the booster.

A general object of this invention is to provide an improved hydraulic pump system capable of high volume, low pressure and low volume, high pressure operation, and which overcomes certain disadvantages of the prior art.

SUMMARY OF THE INVENTION

This invention provides a pump system which is adapted for operation with high efficiency in either a high volume low pressure mode or a low volume high pressure mode. This is accomplished by a combination of a first pump and an additional pump which are driven concurrently. An unloading valve is operative to dump the output of the additional pump in response to fluid pressure so that it delivers fluid to the load device when the pressure is below a predetermined value and not when it is above the predetermined value. The outlets of the pumps are connected with a common discharge passage and the unloading valve is responsive to pressure in the passage. A unidirectional flow means is provided to prevent back flow in the outlet of the additional pump. Preferably, the pumps are internal gear pumps and have a common drive shaft.

Further, in accordance with this invention, the unloading valve comprises a valve element with biasing means for urging it toward the closed position for obstructing dumping and with means actuated by fluid pressure for urging it away from the closed position so that it is opened for dumping at a predetermined pressure. Preferably, the valve element includes a stem and an enlarged head with fluid pressure acting on the stem for urging the valve element away from the closed position. The head obstructs dumping when the valve is closed and allows dumping when the valve is opened. Further, a flow restrictor is provided in the flow path from the unloading valve whereby the opening of the valve is assisted by pressure drop at the restrictor. Further, a second biasing means becomes operative when the valve element is open for yieldingly resisting further opening movement of the valve element whereby the unloading valve serves as an accumulator.

Further, in accordance with this invention, the pumps are driven by an electric motor which is controlled by means actuated by the valve element. In one embodiment, the valve element actuates a switching means to turn off the motor at a predetermined pressure. In another embodiment, a changeable speed motor is employed and the valve element actuates switching means for reconnecting the motor for low speed operation at a predetermined pressure. In another embodiment, the motor energization is controlled in a continuously varying manner by means responsive to the position of the valve element.

Further, this invention provides a booster pump system especially adapted for use with the hydraulic brake system of a vehicle. This is accomplished by a pair of internal gear pumps having different displacement and driven by a common motor with an unloading valve dumping the output of the larger displacement pump in response to pressure. The outlets of the pumps are connected with a common discharge passage and the unloading valve is responsive to pressure in the common discharge passage. The unloading valve comprises a valve element which is urged by a biasing means toward its closed position for obstructing dumping and which is urged by fluid pressure away from the closed position to open the valve at a predetermined pressure. The valve element includes a stem and an enlarged head and fluid pressure acts on the stem to urge the valve element away from the closed position. A flow restrictor is provided in the flow path from the unloading valve whereby opening of the unloading valve is assisted by pressure drop at the restrictor. An additional biasing means becomes operative when the valve is opened and yieldingly resists further opening movement of the valve element whereby the unloading valve serves as an accumulator. Means adapted to be actuated by the valve element controls the energization of the motor. In one embodiment, the valve element actuates a switch which deenergizes the motor at a predetermined position of the unloading valve. In another embodiment, a changeable speed motor is provided and switch means adapted to be actuated by the valve element reconnects the motor for low speed operation at a predetermined position of the unloading valve. In yet another embodiment, the motor energization is controlled in a continuously varying manner by means responsive to the position of the unloading valve.

A more complete understanding of this invention may be obtained from the detailed description that follows taken with the accompanying drawings.

BEST MODE FOR CARRYING OUT THE INVENTION

Referring now to the drawings, there is shown an illustrative embodiment of the invention in a plural pump system with each pump having a different displacement capacity. A particular illustrative embodiment is shown in an hydraulic booster pump system for use in the brake system of a motor vehicle. It will be appreciated, as the description proceeds, that the invention is useful in other hydraulic systems which require both high volume at low pressure and low volume at high pressure.

Figure 1:
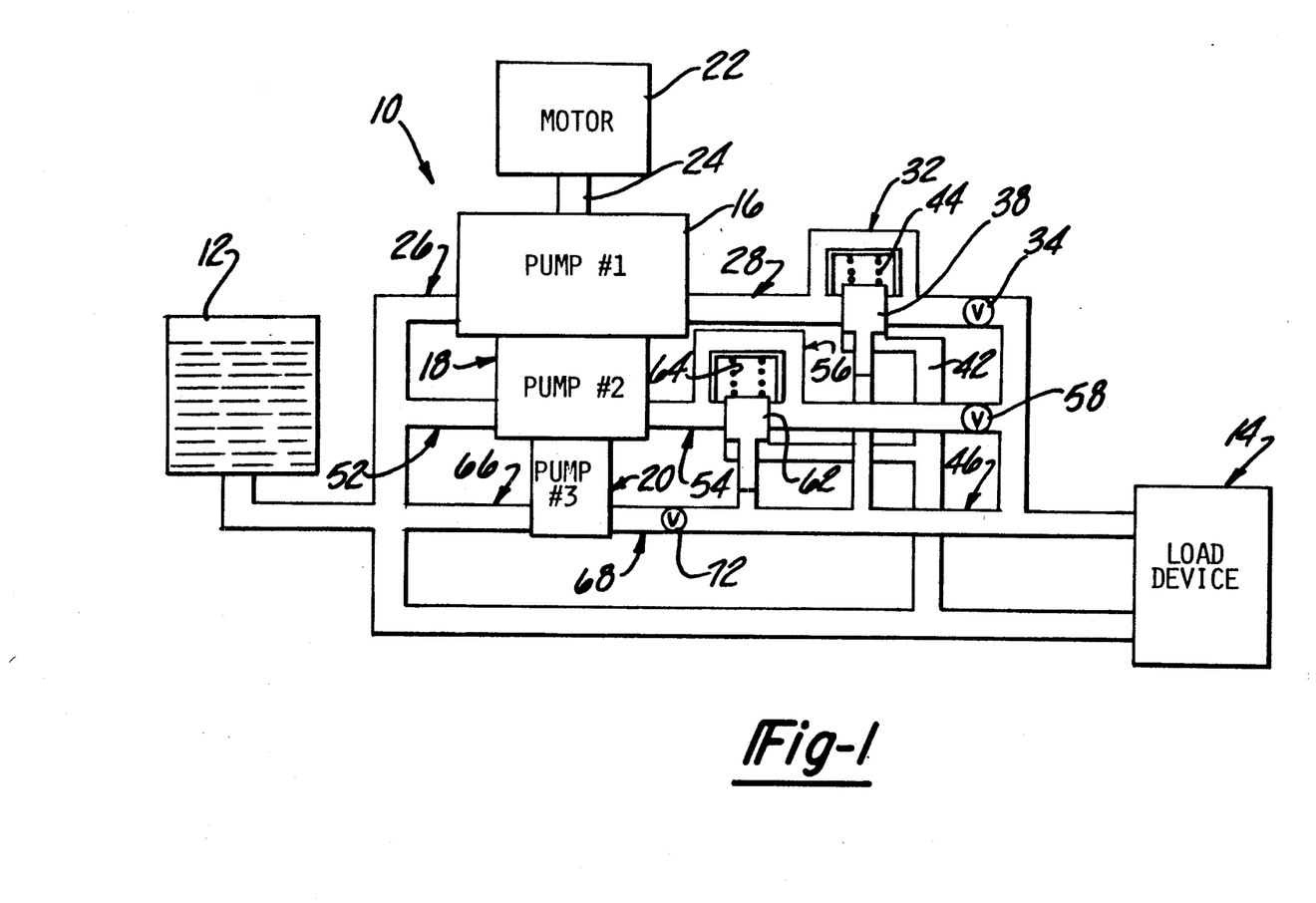
FIG. 1 is a schematic diagram of the pump system of this invention.

The invention will be described first with reference to the schematic diagram of FIG. 1. In the system of FIG. 1, the pump system 10 of this invention is adapted to receive hydraulic fluid from a reservoir 12 and supply pressurized fluid to a hydraulic load device 14. The load device 14 may be any of the wide variety of hydraulic devices which is required to be energized with both high volume fluid flow at low pressure and with relatively low volume flow at high pressure.

The pump system 10 comprises a set of three pumps 16, 18 and 20. The pump 16 has a relatively high volume displacement, pump 18 has an intermediate volume displacement and the pump 20 has a relatively low volume displacement. Each of the pumps is a rotary, positive displacement pump. All of the pumps are driven from a single motor 22 by a drive shaft 24, which is preferably common to all of the pumps.

Pump 16 has an inlet 26 connected with the reservoir 12 and an outlet 28 which communicates with the load device 14 through a passage or conduit 32, a check valve 34 and a common discharge passage 46. An unloading valve 38 is disposed between the passage 32 and a return passage 42 which communicates with the reservoir 12. The unloading valve 38 obstructs flow from the outlet 28 to the return passage 42 when the valve is closed. The valve 38 is biased toward its closed position by a spring 44 and it is urged toward its open position by fluid pressure in the common discharge passage 46. When the pressure in the common discharge passage 46 reaches a predetermined value, the unloading valve 38 is opened and the outlet of the pump 16 is dumped through the passage 42 to the reservoir and the pump operates in an idle condition. In this condition, the check valve 34 prevents back flow from the common discharge passage 46 to the outlet 28 of pump 16.

Pump 18, which has a smaller displacement than pump 16, has an inlet 52 connected with the reservoir 12 and it has an outlet 54 which communicates through a passage or conduit 56 and a check valve 58 and the common discharge passage 46 with the load device 14. An unloading valve 62, in its closed position, obstructs fluid flow from the outlet 54 to the return passage 42 which communicates with the reservoir 12. The unloading valve 62 is biased toward its closed position by a spring 64. It is urged toward its open position by fluid pressure from the common discharge passage 46. When the pressure in the passage 46 reaches a predetermined value, which is higher than the pressure value at which valve 38 opens, the unloading valve 62 is opened and the outlet of the pump 18 is dumped through the return passage 42 to the reservoir and the pump operates in an idle condition.

The pump 20, which has a relatively low displacement, has an inlet 66 communicating with the reservoir 12 and an outlet 68 which communicates through the check valve 72 and the common discharge passage 46 with the load device 14. The check valve 72 is required only if the pump 20 is driven intermittently.

In operation of the pump system 10, as depicted in FIG. 1, pumps 16, 18 and 20 are driven simultaneously by the motor 22. Further, the unloading valve 38 is adapted to open at a first predetermined pressure in the common discharge passage 46 and the unloading valve 62 is adapted to open at a second predetermined pressure, the second predetermined pressure being higher than the first. For explanatory purposes, it will be assumed that the load device 14 requires a high volume of fluid at low pressure when the motor is first turned on and that the flow requirement diminishes and the fluid pressure requirement increases over a period of time until the only flow is that needed to supply the loss due to leakage.

When the motor 22 is first started, the pressure in the common discharge passage 46 is zero which is lower than the first predetermined value and consequently the unloading valve 38 and the unloading valve 62 are both closed. Accordingly, all three pumps 16, 18 and 20 supply pressurized fluid through the common discharge passage 46 to the load device 14. When the pressure in the common discharge passage 46 increases to the first predetermined pressure, the unloading valve 38 is opened thereby against the resistance of spring 44 and the output of pump 16 is dumped to the reservoir so pump 16 imposes minimal load on motor 22. Check valve 34 prevents back flow to the outlet of pump 16. As the fluid pressure increases further in the common discharge passage 46 to the second predetermined pressure, the unloading valve 62 is opened and the outlet of pump 18 is dumped to the reservoir so pump 18 imposes minimal load on motor 22. The check valve 58 prevents back flow from the discharge passage 46 to the outlet of pump 18. Thus both pumps 16 and 18 are operated in an idle condition and the pump 20 continues to supply pressurized fluid through the common discharge passage 46 to the load device. This mode of operation continues so long as the pressure in the discharge passage 46 is greater than the second predetermined pressure. If the pressure decreases below this value, the unloading valve 62 will be closed and pump 18, in addition to pump 20, will supply pressurized fluid to the load device. If the pressure should decrease below the first predetermined pressure, the unloading valve 38 will be closed and all three pumps will again supply pressurized fluid to the load device.

A particular illustrative embodiment of the invention is a hydraulic booster pump system for use in a brake system of a motor vehicle. This illustrative embodiment will now be described with reference to FIGS. 2 through 8.

Figure 2:
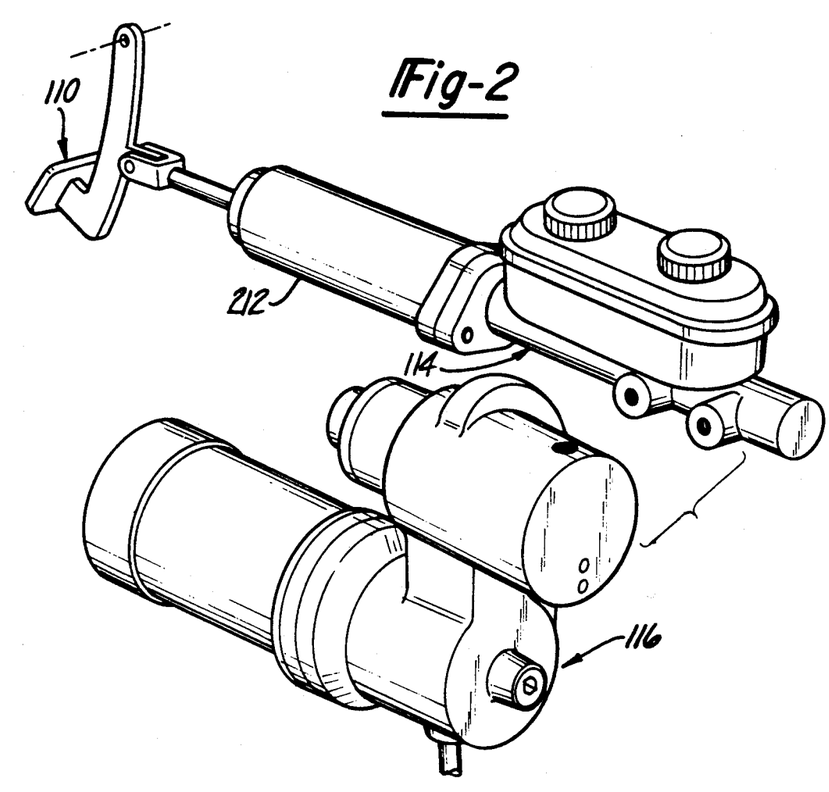
FIG. 2 is a pictorial view showing the pump system of this invention as it is embodied in an hydraulic brake system of a motor vehicle.

A vehicle hydraulic brake system which incorporates the subject invention is represented in the pictorial view of FIG. 2. This system comprises a brake pedal 110 which is manually actuated to operate a hydraulic booster 212, which in turn energizes a master cylinder 114. A booster pump system 116, constructed in accordance with this invention, supplies pressurized hydraulic fluid to the booster 212.

Figure 3:
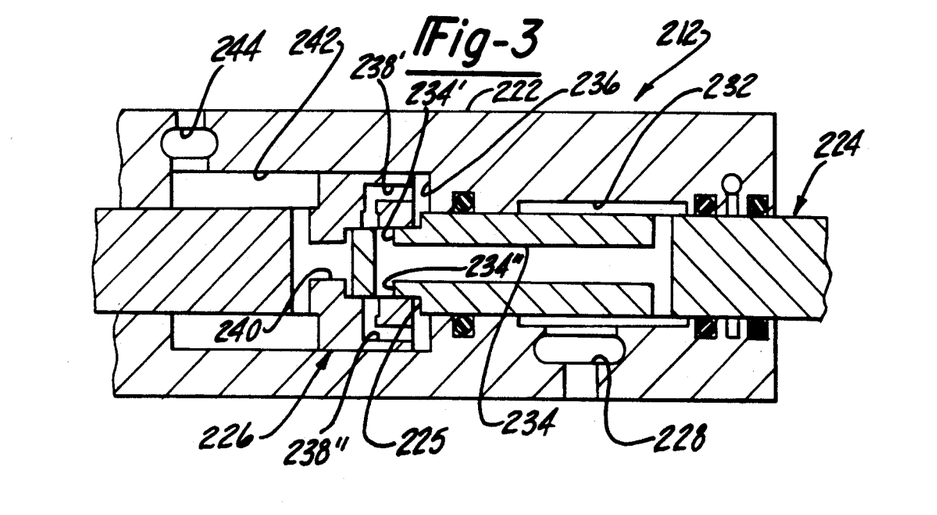
FIG. 3 shows a hydraulic brake booster.

The hydraulic booster 212 is depicted further in FIG. 3 and will be described briefly prior to the description of the booster pump system 116. Hydraulic boosters are well known and a booster of conventional design may be used with this invention; however, the booster shown in FIG. 3 is especially adapted for use with the booster invention. This booster, which is of simple economical and compact design, is advantageous in a system, as in this invention, which does not rely on an accumulator and the attendant requirement for minimum leakage.

In general the booster comprises a body or cylinder 222, a control element 224 and an output piston 226. The control element 224 is connected with the brake pedal 110 through suitable linkage and is actuated thereby. The output piston 226 is operatively connected with the master cylinder 114 which pressurizes the brake fluid in the brake lines to the wheel cylinders to exert braking effort in accordance with the manual effort applied to the brake pedal. Pressurized fluid from the pump system 116 is supplied to the booster through an inlet passage 228 which communicates with annular chamber 232. Fluid from the chamber 232 is supplied through a passage 234 in the control element 224 to a pressure chamber 236 in the manner to be described below. At times, the pressure chamber 236 may be connected through passages 238' and 238" and through a passage 240 to a chamber 242 and then to a sump or low pressure reservoir through an outlet passage 244 whereby fluid is released from pressure chamber 236.

When the brake pedal 110 is in its free or retracted position, the control element 224 is retracted so that fluid is blocked from flowing through passages 234' and 234" into passages 238' and 238". When the brake pedal 110 is depressed, the control element 224 moves to the left relative to the output piston 226 causing passages 234' and 234" to move toward alignment with passages 238' and 238". Leftward movement of control element 224 relative to the output piston 226 tends to close the communication through passages 238' and 238" of the pressure chamber 236 with the passage 240 and the reservoir and allows a build-up of pressure in chamber 236. Further travel of the control element 224 relative to the output piston 226 causes passages 234' and 234" to communicate with passages 238' and 238" and causes the pressure chamber 236 to be pressurized. The pressure in chamber 236 acts on the output piston 226 which exerts a force on the piston of the master cylinder to apply the brakes. The pressure in chamber 236 also acts on the face 225 of control element 224 with a force proportional to the pressure in chamber 236 which is imparted through the brake pedal 110 to give the driver an indication of the braking force. Increased force on the brake pedal causes further leftward movement of the control element 224 and additional pressurized fluid is admitted to the pressure chamber 236 causing further movement of the output piston 226 such that it tends to follow the movement of the control element 224. When the brake pedal is released, a spring (not shown) in combination with the pressure in the pressure chamber 236 acting on face 225 of the control element 224 urges it to the right so that the brake pedal assumes its free position. The pressure in chamber 236 is relieved through passages 238' and 238" which communicates through passage 240 with the outlet chamber 242 and the outlet passage 244 to the reservoir. The output piston 226 is restored to its home position by the master cylinder. The booster is failsafe in that the control element 224 is adapted to mechanically engage the output piston 226 which is then actuated by motivating force from the brake pedal, in the event that fluid pressure fails to move the output piston 226.

Figure 4:
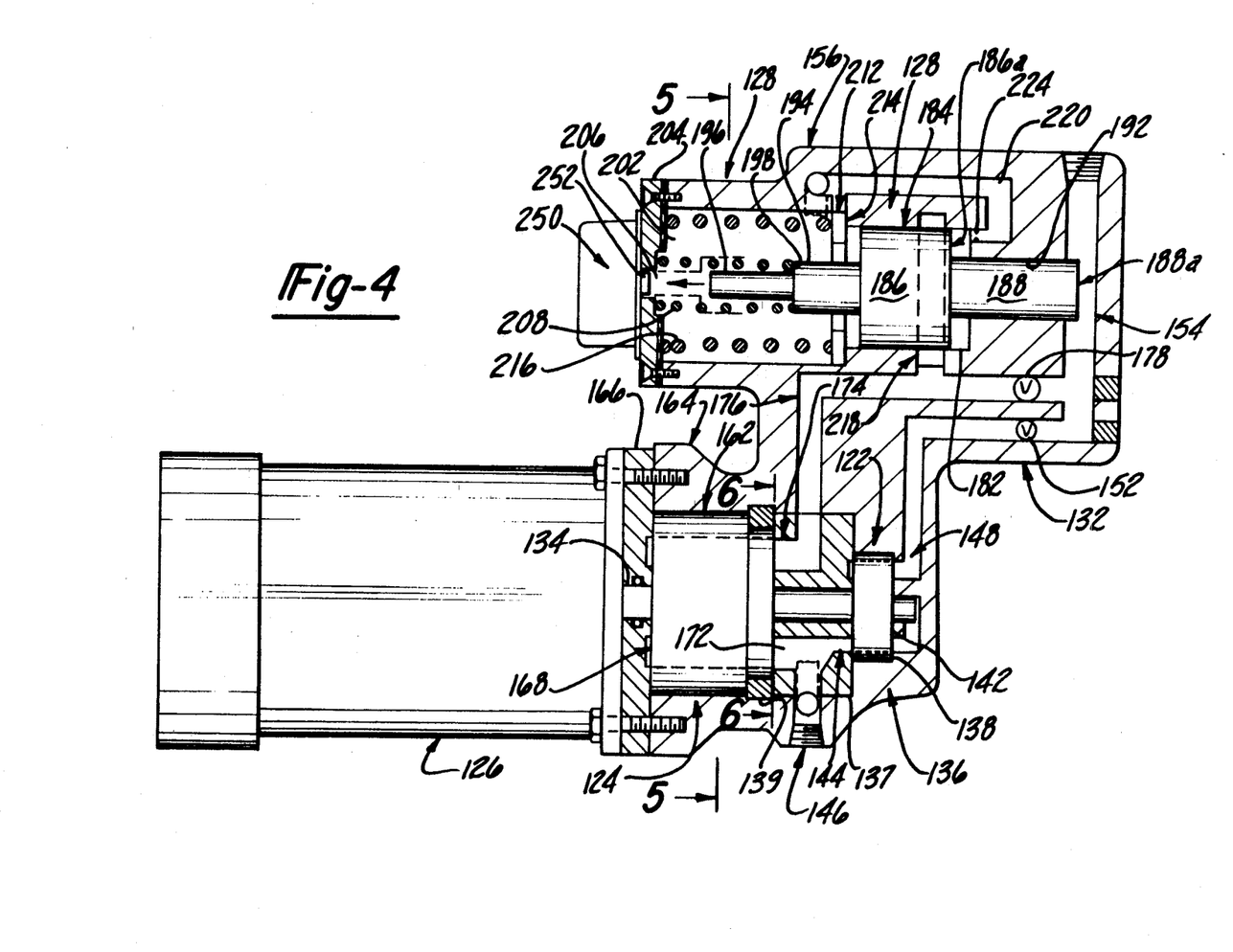
FIG. 4 shows the construction of the pump system of this invention.
Figures 5, 6, 7, 8, 9:
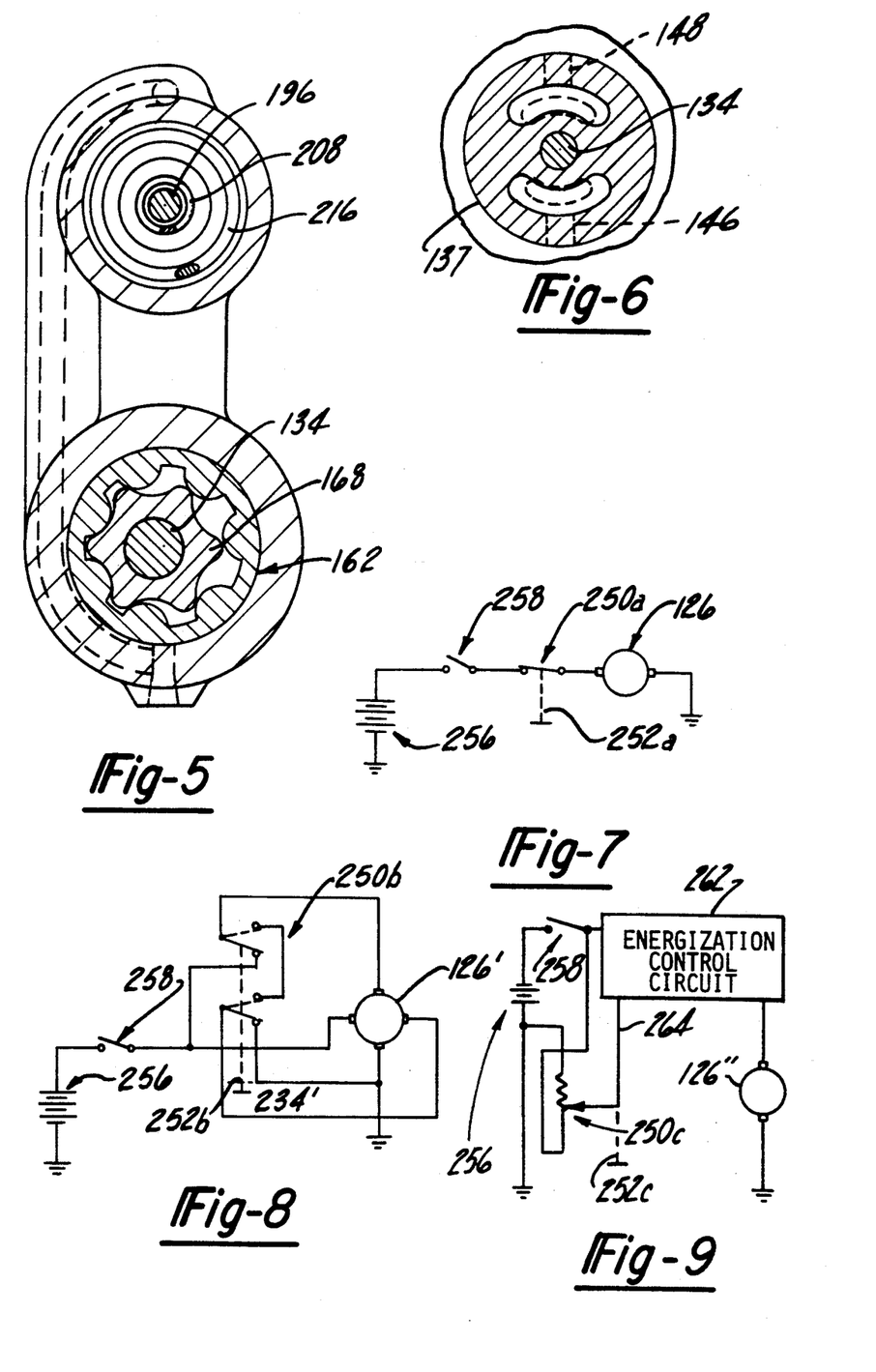
FIG. 5 is a view taken of lines 5—5 of FIG. 4.
FIG. 6 is a view taken on lines 6—6 of FIG. 4.
FIGS. 7, 8 and 9 are is a schematics of alternate motor control circuits.

The booster pump system 116, as it is adapted for use in the hydraulic brake system of FIG. 2, is depicted in detail in FIGS. 4, 5 and 6. In general, the booster pump system comprises a first pump 122 of relatively small displacement and a second or additional pump 124 of relatively large displacement, both of which are driven by an electric motor 126. Additionally, the pump system comprises an unloading valve 128.

The pumps 122 and 124 share a common housing 132 and are connected with the motor 126 by a common drive shaft 134. Both pumps 122 and 124 are internal gear pumps with one-tooth difference, known as a gerotor type pump.

The smaller displacement pump 122 comprises an internal gear 138 which is rotatably mounted in the pump body 136 which is preferably integral with the casing 132 and held by a pressure plate retainer 137. Pressure plate retainer 137 is held in place by ring 139. The pump includes an impeller 142 which is mounted for rotation on the drive shaft 134 eccentrically of the internal gear 138. The pump has an inlet 144 which communicates with the reservoir (not shown) through a suitable fitting 146 in the casing 132. The pump has an outlet 148 in the body 136 which is connected through a check valve 152 with a common discharge passage 154 in the body 156 of the unloading valve 128.

The larger displacement pump 124 comprises an internal gear 162 which is rotatably mounted in the pump body 164 which is preferably integral with the casing 132 and held by a pressure plate retainer 166. The pump includes an impeller 168 which is mounted for rotation on the drive shaft 134 eccentrically of the internal gear 162. The pump has an inlet 172 which is in fluid communication with the reservoir through the fitting 146 in the casing 132. The pump has an outlet 174 which communicates through an outlet passage 176 and a check valve 178 in the body 156 of the unloading valve 128.

The unloading valve 128 comprises a valve body 156 which defines a valve cylinder 182. A valve piston 184 has an enlarged head 186 slidably mounted in the cylinder 182 and a first stem 188 which extends from one end of the head 186 and is slidably mounted in a bore 192 in the body. The stem 188 terminates in a face 188a in fluid communication with the discharge passage 154. Additionally, the piston 184 includes a second stem 194 extending from the other end of the head 186. Stem 194 includes a stem part 196 of reduced diameter and an annular shoulder 198 at the base of stem part 196. The stem 194 and stem part 196 extend into a cavity 202 in the body 156. A cover plate 204 is secured to the body and closes the cavity 202. The stem part 196 is adapted to pass through an opening 206 in the cover plate 204.

The piston 184 is biased towards the closed position by a helical spring 208 which has one end seated upon the shoulder 198 and the other end in abutment with the cover plate 204. The cavity 202 also contains a spring retainer 212 which seats against a stop shoulder 214 at the end of the cavity 202. A helical spring 216, which is much stronger than spring 208, has one end seated on the spring retainer 212 and the other end in abutment with the cover plate 204.

The unloading valve 128 has an inlet 218 in communication with the outlet passage 176 from the larger displacement pump 124. The inlet 218 is of annular configuration and surrounds the piston head 186. The unloading valve 128 has an outlet 220 which communicates through a flow restrictor 224 with the cylinder 182. Flow restrictor 224 may be a simple orifice or may be any such conventional means to maintain an approximately constant pressure drop. The outlet 220 is in fluid communication with the reservoir through a passage (not shown). When the piston 184 is in its closed position, the piston head 186 obstructs fluid flow between the valve inlet 218 and the valve outlet 220. When it is in its open position, a flow path extends from the inlet 218 through the flow restrictor 224 to the outlet 220.

For the purpose of control of the motor 126, a control device 250 is adapted for operation by the stem part 196 on the piston 184. As shown in FIG. 4, the device 250 is mounted on the cover plate 204 and has an actuator plunger 252 in alignment with the hole 206. A control circuit for the motor 126 is depicted in FIG. 7. In this circuit, the control device 250 is a switch 250a. The circuit comprises, in general, a vehicle battery 256 for energizing the motor 126 through a brake switch 258, and the switch 250a. The battery 256 has its negative terminal connected to ground and its positive terminal connected to one terminal of the motor 126 through the series combination of switches 258 and 250a. The other terminal of the motor 126 is connected to ground. The brake switch 258 is a normally open single pole single throw switch which is closed by actuation of the brake pedal. The control switch 250a is a normally closed single pole single throw switch which has an actuating plunger 252a which opens the switch when engaged by the stem part 196. Thus, when the brake switch 258 is closed by actuation of the brake pedal and when the control switch 250a is closed, the motor 126 is energized and the pumps 124 and 122 are operated. When either switch 250a or switch 258 is opened the motor 126 is turned off and both pumps stop.

Another control circuit is shown in FIG. 8 to provide for two-speed operation of the pumps. For this purpose, the motor 126' is a changeable speed motor. The motor 126' has two pairs of brushes which may be connected in parallel for high speed operation or in series for low speed operation. In this circuit, the control device 250 is a double pole double throw switch 250b. In general, the control circuit comprises the vehicle battery 256, the brake switch 258 and the control switch 250b. The control switch 250b has an actuating plunger 252b which is operated by the stem part 196. When the actuating plunger 252b is in its extended position, as shown in FIG. 8, the switch 250b connects the motor 126' across the battery with the two pairs of brushes in parallel for high speed operation of the motor. When the actuating plunger 252b of the switch is depressed, (phantom lines) the motor 126' is connected across the battery with the two pairs of brushes connected in series for slow speed motor operation.

Another control circuit is shown in FIG. 9 to provide for variable energization of the motor 126". The motor is connected across the battery 256 through the brake switch 258 and through an energization control circuit 262. The energization control circuit 262 may be a conventional transistor circuit for varying the effective voltage applied to the motor. The energization control circuit 262 has a signal voltage input 264 and is adapted to provide an increasing voltage to the motor in response to an increasing signal voltage. The control device 250 is a potentiometer 250c connected across the battery 256. The movable contact of the potentiometer is displaceable by the actuator 252c. When the brake switch 258 is closed by actuation of the brake pedal and when the actuating plunger 252c is in its extended position, as shown in FIG. 9, the potentiometer applies a relatively high voltage signal to the input 264 and the energization control circuit 262 applies a relatively high voltage across the motor. When the actuating plunger 252c is depressed, the potentiometer 250c applies a relatively low signal voltage to the input 264 and the energization control circuit 262 applies a relatively low energizing voltage to the motor. It will be apparent that the energization control circuit 262 may be of any known type for varying the voltage, current or power to the motor.

The operation of the booster pump system in the hydraulic brake system will now be described with reference to FIGS. 3 through 8. As previously noted, the motor circuit is energized through the brake switch 258 from the battery 256. The brake switch is actuated by the brake pedal and may be the same switch that energizes the vehicle brake lights. With the brake pedal 110 in its free position, the brake switch 258 is open and no power is applied to the motor 126. When the driver depresses the brake pedal, the initial movement thereof causes the brake switch to close and the motor is energized. The mode of operation of the system will depend upon the rate of displacement of the brake pedal by the driver. Two modes of operation will be described; first, a panic stop produced by rapid depression of the brake pedal and second, a gradual stop produced by slow depression of the brake pedal.

In the case of a panic stop, the driver forcefully depresses the brake pedal causing it to be moving fast at the time the brake switch 258 is closed. This will create an immediate demand for a large volume of low pressure fluid and as soon as the switch closes, the motor will quickly approach maximum speed and drive the pumps at near maximum speed. At pump start-up, the pressure in the discharge passage 154 is low and the unloading valve 128 is closed. While the unloading valve remains closed, both the small displacement pump 122 and the large displacement pump 124 deliver fluid to the discharge passage 154. Most or all of the output from the discharge passage enters the inlet passage 228 of the booster 212 and flows through the annular chamber 232 to passage 234 and thence through passages 234′ and 234″ to passages 238′ and 238″ to the pressure chamber 236. This causes a pressure build-up in the chamber 236 which applies pressure to the piston 226 to assist the driver in applying the brakes. It is possible in this mode of operation, that the failsafe character of the booster 212 will come into effect and the driver will force the output piston to move ahead of the fluid supply to the pressure chamber 236 thus tending to draw fluid into the chamber.

When the vehicle braking system becomes pressurized, the demand for pressurized fluid will decrease, the motor speed will decrease due to the increased load and the flow rate of the pressurized fluid will drop. The pressure at the discharge passage 154 of the pumps will increase, thus increasing the force acting on the face 188a of the stem 188. When the pressure increases to a first predetermined value, this force will exceed the bias force exerted by the spring 208, the piston 184 will move toward the open position. When the displacement of the piston is great enough so that fluid is admitted to the cylinder 182, the flow restrictor 224 will cause a back pressure to develop in the cylinder 182. The pressurized fluid in cylinder 182 acts on the face 186a of the piston head 186 and increases the opening force, causing the unloading valve to move abruptly to its open position. The valve is in the open position when the bias spring 208 is compressed sufficiently that the piston head 186 is in engagement with the spring retainer 212 and unobstructed fluid flow is permitted from the inlet 218 to the cylinder 182.

With the unloading valve 128 open, i.e. dumping, the larger displacement pump 124 will idle, i.e. the outlet passage 176 will be connected through the cylinder 182, the flow restrictor 224 and the outlet passage 220 with the reservoir. In this condition, the smaller displacement pump 122 will continue to deliver pressurized fluid to the common discharge passage 154 and the output thereof will be diminished to a fraction of the previous flow, although the diminished load on the motor will enable it to run faster. The diminished flow may be inadequate to meet the demand and the pressure in the discharge passage 154 may fall off and the unloading valve may reclose. Several cycles of the opening and closing of the unloading valve may occur before the demand for fluid drops to a point that can be met by the smaller displacement pump. This effect can be minimized, if desired, by inclusion of a third intermediate displacement pump and a second unloading valve, as described with reference to FIG. 1. Finally, the demand for fluid will drop to a minimal value because the driver is satisfied with the braking force and does not increase the force applied to the pedal or because he is demanding and obtaining the maximum boost from the system. As the demand for fluid diminishes, the pressure in the common discharge passage 154 increases and thus the force on the face 188a of the stem 188 increases. When the pressure increases to a predetermined value, this force on the stem 188 will exceed the force exerted on the spring retainer 212 by the spring 216, plus the force exerted by the spring 208, and the piston 184 will move and further compress the springs 208 and 216 and store energy therein. As the pressure further increases in the discharge passage 154, the springs 208 and 216 are further compressed and the unloading valve functions as a pressure accumulator, i.e. the face 188a on the stem 188 under the influence of the compressed springs 208 and 216, exerts force on the fluid in the passage 154 and maintains it in a pressurized condition. When the pressure in discharge passage 154 reaches a predetermined pressure, under the influence of the smaller displacement pump 122, the piston 184 will be displaced sufficiently against the springs 208 and 216 that the stem part 196 will actuate the actuating plunger 252a of the switch 250a. As described with reference to FIG. 7, this will open the switch 250a and the motor 126 will be deenergized. Accordingly, pumping action by the smaller displacement pump 122 will cease but pressure will be maintained in the discharge passage 154 by the force of springs 208 and 216 on the piston 184 causing it to function as a pressure accumulator. Assuming that the brake pedal position remains constant, either requiring maximum boost or some value less than maximum, the braking force will remain at a steady value and the only flow required will be that needed to replenish leakage. In this condition, the piston 184 will move under the influence of the springs 208 and 216 to supply the fluid to replenish leakage. When the stem part 196 moves sufficiently, the switch 250a will be closed and the motor 126 will be turned on to drive the pumps 124 and 122. Since the unloading valve 128 is open, only the smaller displacement pump 122 will supply pressurized fluid to the discharge passage 154. This will increase the fluid pressure in the passage 154 in the manner described above.

In case of gradual brake application by the driver, the brake switch 258 is closed during the initial movement of the brake pedal and the motor 126 is turned on. Except for fluid leakage, there is no immediate demand for fluid flow because the passages 234′ and 234″ in the booster are obstructed. Thus, the pressure in the discharge passage 154 increases and the unloading valve 128 is opened. With the unloading valve opened, the larger displacement pump 124 idles and the smaller displacement pump pressurizes the output passage 154. The increasing pressure in the discharge passage 154 will increase the compression of the springs 208 and 216 until the pressure reaches a predetermined value. At this point, the plunger 252a of the switch 250a will be depressed sufficiently that the switch 250a will be opened turning off the motor 126. As described above, the force of the springs 208 and 216 maintains the pressurization of the fluid in discharge passage 154. As the driver further depresses the brake pedal, the passages 234' and 234" move into alignment with passages 238' and 238" and fluid flows into the pressure chamber 236 causing piston 184 to move toward the passage 154 in its capacity as accumulator. When the stem part 196 moves sufficiently, the switch 250a will be reclosed to start the motor. With fluid flow into the pressure chamber 236, there will be a pressure drop between the passages 234' and 234" and the passages 238' and 238", respectively, to control the pressure in chamber 236 and cause the output piston 226 to move in synchronism with the control element 224. As the pedal is further depressed and the flow increases up to a certain point, the unloading valve 128 will remain open and the smaller displacement pump 122 will deliver the required flow. However, if the flow rate exceeds the capacity of the smaller displacement pump 122, the pressure in the discharge passage 154 will decrease and the unloading valve 128 will close causing the larger displacement pump 124 to become operative and both pumps will deliver fluid to the discharge passage 154. When the vehicle braking system becomes pressurized, the demand for fluid will diminish and the unloading valve 128 will open and the pressure at the discharge passage 154 will increase. The increasing pressure will compress the springs 208 and 216 and when the stem part 196 moves sufficiently, the motor will be turned off. The pressure in the discharge passage 154 will vary as a result of leakage and with the variations of brake application by the driver. Small amounts of fluid will be supplied by piston 184 functioning in its capacity as accumulator. When the stem part 196 moves sufficiently as a consequence of supplying pressurized fluid in the capacity of accumulator motor 126 will be turned on.

The operation of the booster pump system was described above with reference to a motor control circuit as depicted in FIG. 7. In that system, the unloading valve 128 performs the additional function of a pressure accumulator and when the position of stem part 196 moves actuator 252a sufficiently upwards as shown schematically in FIG. 7, the motor is turned off. It will now be understood that when the booster pump system utilizes the motor control circuit of FIG. 8, the operation is similar in that the unloading valve 128 additionally functions as a pressure accumulator. The operation differs in that the changeable speed motor 126' is controlled by the switch 250b to operate at high speed or low speed. When the switch 250b is actuated by stem part 196 of the piston 184, the switch 250b reconnects the motor for low speed operation. The motor continues to operate in low speed and may draw on the fluid accumulated as springs 108 and 116 were compressed until the actuating stem moves sufficiently to cause the switch 250b to switch the motor back to high speed operation. The operation of the system using the motor control circuit of FIG. 9 is similar to that just described with reference to the circuit of FIG. 8. The difference is that the circuit of FIG. 9 provides continuously variable motor speed as the stem part 196 causes movement of the actuator 252c under the influence of pressure variations in the discharge passage 154.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A pump system for supplying pressurized hydraulic fluid, the system comprising:

a first pump and a second pump adapted to be driven concurrently and means for combining the outputs of said pumps, an unloading valve for unloading said second pump, a valve element comprising a cylindrical stem and a cylindrical head, said head being of larger diameter than said stem, said head being sealingly movable in a first cylinder having an unloading port in fluid communication with the outlet of said second pump, said valve having a closed position wherein said head blocks flow through said unloading port, said stem being sealingly movable in a second cylinder, said stem being connected with said head for movement thereof, said valve having an open position wherein a portion of said stem allows flow through said port, resilient means urging said valve toward said closed position, means for supplying fluid to said stem at substantially the pressure of said combined outputs for urging said valve toward said open position, whereby said second pump is unloaded through said valve in response to urging of a predetermined fluid pressure.

2. The invention as defined in claim 1 wherein said head and said stem are of unitary construction.

3. The invention as defined in claim 1 wherein:

said resilient means comprises a spring engaging said head, and said means for applying fluid pressure comprises a chamber in fluid communication with the output of said first pump.

4. The invention as defined in claim 1 including:

a fluid conduit disposed downstream from said unloading port, and a flow restrictor in the flow path through said conduit whereby the pressure drop at said restrictor assists the opening of said unloading valve.

5. The invention as defined in claim 1 including:

sensing means responsive to movement of said valve beyond said open position in response to fluid pressure greater than said predetermined pressure.

6. The invention as defined in claim 1 including:

second resilient means adapted to engage said head upon movement of said valve to said open position and to resist movement thereof beyond said open position whereby said valve also functions as an accumulator.

7. The invention as defined in claim 1 wherein:

said pumps are adapted to be driven by an electric motor for supplying pressurized fluid to a vehicle brake booster and including switch means for energizing said motor upon application of the vehicle brakes.

8. A pump system for supplying pressurized hydraulic fluid, the system comprising:

a first pump and a second pump adapted to be driven concurrently and having their outlets connected to a common discharge passage for supplying said pressurized fluid to a load, an unloading valve including a valve body, first and second cylindrical bores in said body, a movable valve element comprising a cylindrical head sealingly slideable in said second bore and a cylindrical stem connected with said head and sealingly slidable in said first bore, said head being of larger diameter than said stem, an end of said head and an end of said second bore defining a chamber therebetween, a port in the cylindrical wall of said second bore and being in fluid communication with the outlet of said second pump, said head having a closed position where it blocks flow between said port and said chamber and having an open position where it does not block flow between said port and said chamber, a bypass passage in fluid communication with said chamber for bypassing said load with the output of said second pump, resilient means urging said head toward said closed position, and means responsive to flow between said chamber and said bypass passage for producing a differential pressure on said head for aiding movement of said head toward said open position, an end of said stem being in fluid communication with said common discharge passage and adapted to move said head from said closed position to said open position in response to a predetermined fluid pressure applied to said stem and admit fluid from the outlet of said second pump to said chamber, thereby aiding the movement of said head.

9. A pump system for supplying pressurized hydraulic fluid, the system comprising:

a first pump and a second pump adapted to be driven concurrently and having their outlets connected to a common discharge passage for supplying said pressurized fluid to a load, an unloading valve including a valve body, first and second cylindrical bores in said body, a movable valve element comprising a cylindrical head sealingly slideable in said second bore and a cylindrical stem connected with said head and sealingly slidable in said first bore, said head being of larger diameter than said stem, an end of said head and an end of said second bore defining a chamber therebetween, a port in the cylindrical wall of said second bore and being in fluid communication with the outlet of said second pump, said head having a closed position where it blocks flow between said port and said chamber and having an open position where it does not block flow between said port and said chamber, a flow restrictor between said chamber and said bypass passage, a bypass passage in fluid communication with said chamber for bypassing said load with the output of said second pump, resilient means urging said head toward said closed position, an end of said stem being in fluid communication with said common discharge passage and adapted to move said head from said closed position to said open position in response to a predetermined fluid pressure applied to said stem and admit fluid from the outlet of said second pump to said chamber, thereby aiding the movement of said head.

10. A pump system for supplying pressurized hydraulic fluid to a brake booster for applying brakes in a vehicle brake system, the pump system comprising:

a first pump and a second pump adapted to be driven by a motor for producing said pressurized fluid, the outlet of said first pump being adapted to be connected to said brake booster and the outlet of said second pump being adapted to be connected to said brake booster through a one-way valve, an unloading valve adapted to open in response to pressure of said pressurized fluid and being coupled with said second pump for unloading said second pump, and switch means for energizing said motor for supplying said pressurized hydraulic fluid at all times that said brakes are applied.

11. A pump system for supplying pressurized hydraulic fluid, the system comprising:

a first pump and a second pump adapted to be driven concurrently and means for combining the outputs of said pumps, an unloading valve having a valve element movable between a closed position and an open position in response to a predetermined fluid pressure and movable beyond said open position in response to fluid pressure greater than said predetermined fluid pressure, said unloading valve being coupled with said second pump and adapted to unload said second pump in response to fluid pressure, first resilient means urging said valve element toward said closed position, second resilient means engaging said valve element upon movement to said open position and resisting movement of said valve element beyond said open position, and sensing means responsive to movement of said valve element beyond said open position.

12. A pump system for supplying pressurized hydraulic fluid, the system comprising:

a first pump and a second pump adapted to be driven concurrently and means for combining the outputs of said pumps, an unloading valve having a valve element movable between a closed position and an open position in response to a predetermined fluid pressure and movable beyond said open position in response to fluid pressure greater than said predetermined fluid pressure, said unloading valve being coupled with said second pump and adapted to unload said second pump in response to fluid pressure, first resilient means urging said valve element toward said closed position, second resilient means engaging said valve element upon movement to said open position and resisting movement of said valve element beyond said open position, whereby said unloading valve also functions as an accumulator.

13. A pump system for supplying pressurized hydraulic fluid, the system comprising:

a first pump and a second pump adapted to be driven concurrently and means for combining the outputs of said pumps in an outlet passage, an unloading valve having a valve piston in fluid communication with said outlet passage, said piston having a valve element thereon which is movable with said piston between a valve-closed position and a valve-open position in response to a predetermined fluid pressure in said passage and movable beyond said valve-open position in response to fluid pressure greater than said predetermined fluid pressure, a bypass passage, said unloading valve being coupled with said second pump for connecting its output to said bypass passage to unload said second pump with said piston in said valve-open position, first resilient means urging said piston toward said valve-closed position, second resilient means engaging said piston upon movement to said valve-open position and resisting movement of said piston beyond said valve-open position, said piston blocking flow from said outlet passage to said bypass passage with said piston in said valve-open position, whereby said piston functions as an accumulator.

* * * * *